No. 672,678. Patented Apr. 23, 1901.
C. KITCHING.
DEVICE FOR TEACHING MUSIC.
(Application filed Feb. 11, 1898.)
(No Model.)
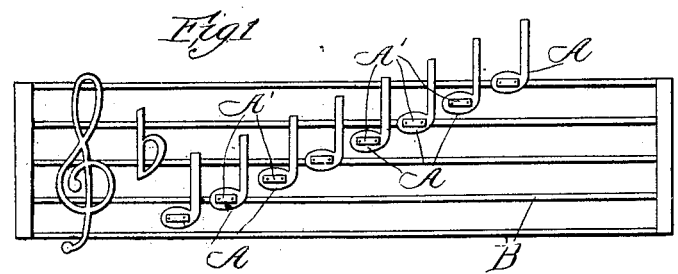
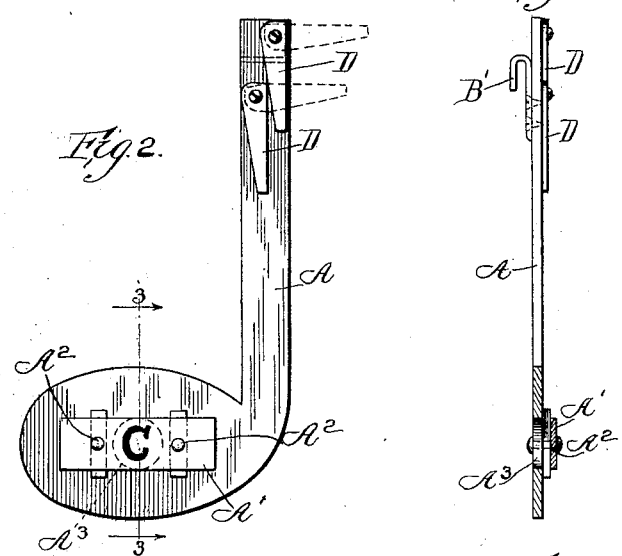
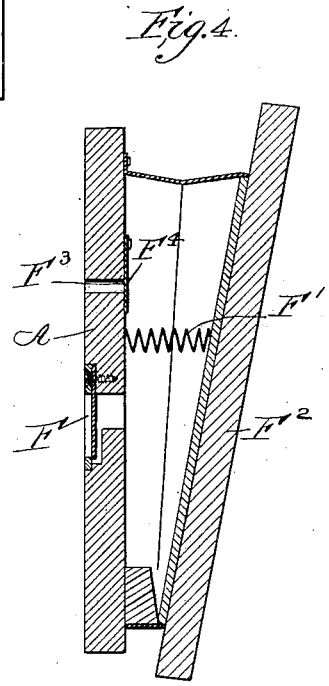
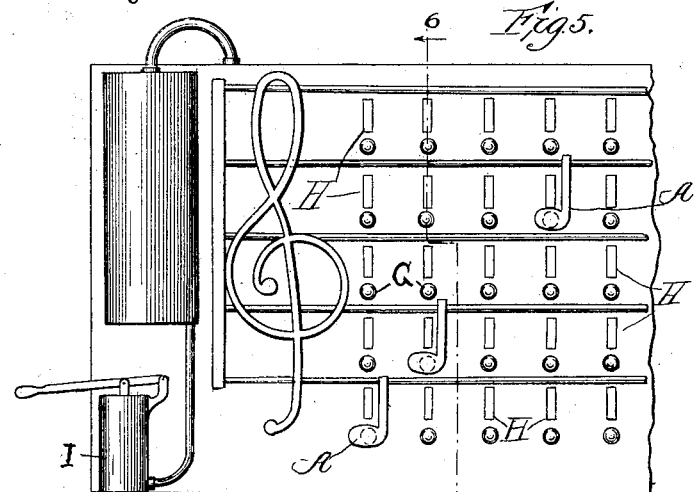
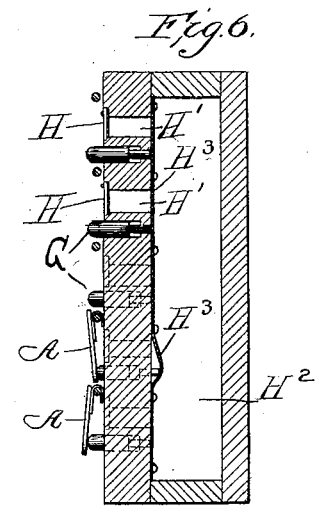
Witnesses:
Edward T. Wray.
Harry White.
Inventor
Cyrus Kitching

UNITED STATES PATENT OFFICE.

CYRUS KITCHING, OF CHICAGO, ILLINOIS.

DEVICE FOR TEACHING MUSIC.

SPECIFICATION forming part of Letters Patent No. 672,678, dated April 23, 1901.

Application filed February 11, 1898. Serial No. 669,948. (No model.)

*To all whom it may concern:*

Be it known that I, CYRUS KITCHING, a citizen of the United States, residing at Chicago, in the county of Cook and State of Illinois, have invented certain new and useful Improvements in Devices for Teaching Music, of which the following is a specification.

My invention relates to devices to be used as aids in teaching or reading music, and has for its object to provide a new and improved device for this purpose.

My invention is illustrated in the accompanying drawings, wherein—

Figure 1 is a view of a device embodying my invention. Fig. 2 is an enlarged view of one form of musical note. Fig. 3 is a section on line 3 3, Fig. 2. Fig. 4 shows a modified form of note. Fig. 5 shows a modified background or staff for the notes. Fig. 6 is a section on line 6 6, Fig. 5.

Like letters refer to like parts throughout the several figures.

In carrying out my invention I provide a series of movable notes adapted to be attached in any convenient manner to a suitable background or staff, each note being preferably provided with means for sounding the musical tone which it represents when in position, so that both the ear and eye of the pupil or other person are simultaneously brought into use. The notes are also preferably provided with the characters by which they are designated, so that one note may be easily and quickly distinguished from another in placing them in their proper positions on the staff.

It is of course evident that any form of notes or any form of device for sounding the musical tone of the notes may be used in connection with my device, and I have only shown some simple constructions for this purpose in order to make my invention clear.

In Fig. 1 I have shown a series of notes A in position on the staff, each note being provided with a means for sounding the musical tone which it represents. This means may consist, for example, of the sounding-piece A', adapted to give forth the proper musical tone when struck, the sounding-piece being connected to the note in any convenient manner, as by means of the pins $A^2$, and being placed in front of an opening $A^3$ in the body of the note. Each note is provided with some suitable means of attaching it to the staff. This staff may be made up in any suitable manner, as by means of strips B, fastened to a suitable background, the notes being hung thereon by means of the holding-pieces B', attached to the notes, the holding-piece being slipped over one of the strips B so that the said strip is between the note and the holding-piece. These holding-pieces may be placed in proper position upon the note, so that when engaging one of the strips B the note will be in its proper position—as, for example, on the line or in the space between the lines. It is of course evident that any suitable means for attaching the notes to the staff may be used, and I have shown this simple construction in order to make the matter clear. The notes may also be provided with the movable arms D D, which are adapted to be moved outward, as shown in dotted lines in Fig. 2, so as to change the character of the note with relation to time.

In Fig. 4 I have shown a note in which the device for sounding the musical tone consists of a reed F, connected with the note, the note being provided with means for setting the reed in vibration. I have shown this means as consisting of bellows F', fastened to the note and adapted to bear against the background $F^2$, the device being so arranged that by pressing upon the note when it is in position the bellows will be compressed and the reed vibrated. The bellows is also provided with an inlet $F^3$, by which air may be admitted when the pressure on the note is relieved, such inlet being provided with a suitable valve $F^4$. Instead of placing the device for sounding the musical tone directly on the note I may attach it to the staff or background. I have shown such a construction in Figs. 5 and 6, wherein the background is provided with a series of projecting parts or push-buttons G, these push-buttons being distributed over the staff at all points where it will be necessary to place a note. Associated with each push-button is a suitable device for sounding the musical tone of the note which occupies the same position upon the staff as the push-button. As illustrated in the drawings, this device consists of a reed H, as shown in Fig. 6, each reed being connected by a passage-way H' with a reservoir or air-chamber H², placed back of the staff. The notes when in position are each opposed to one of these push-buttons, and the openings H' are provided with the flexible valves H³, which are also opposed to the notes and push-buttons. By pushing the note toward the background the push-button is pushed inward, so as to force the valve to the position shown, for example, in dotted lines, thus allowing air to escape and setting the reed in vibration. Any suitable air-chamber may be used for this purpose. The air-chamber may be supplied in any suitable manner—as, for example, by means of the bellows or air-pump I, located in any convenient position.

I have shown here several simple means of producing the musical tone which is represented by the note when in position on the staff; but it is of course evident that any other suitable means for this purpose may be employed. It is also evident that the staff and background may be made up in any desired manner and that all the suitable musical characters—such as clefs, sharps, flats, naturals, and the like—may be made up so that the complete piece of music may be represented upon the staff, the parts preferably being so arranged that the same staff may be used for any piece of music desired, the several parts being movable and interchangeable for this purpose. Any suitable material may be used for making up the staff, notes, and the like—as, for example, wood, tin, and the like—and the lines of the staff may consist simply of lines placed on a blackboard, the blackboard or background, of whatsoever nature, being provided with means for attaching the notes thereto.

The instructor in using my device is preferably provided with a pointer or the like, so that he may point out the notes or strike them or otherwise use the invention while standing at one side of the staff and without obstructing the view of the pupil.

I claim—

1. A device to be used in teaching music, comprising a suitable staff adapted to be supported in view of the student, a series of removable parts shaped to represent musical notes, a holding device attached to each note, a series of engaging devices on the staff adapted to be removably engaged by the holding device and so positioned that the notes may be interchanged and arranged in various positions, a tone-producing device associated with each note and adapted to be set in operation by striking the note, whereby the eye and ear are simultaneously affected.

2. A device to be used in teaching music, comprising a staff, a series of removable parts shaped to represent musical notes, a holding device on each note, a series of engaging devices on the staff adapted to be removably engaged by the holding devices on the notes, whereby the notes may be placed in various positions, a tone-producing device associated with each note adapted to be actuated by striking the note, and one or more movable arms attached to the stems of the notes and adapted to be moved so as to change the character of the notes.

3. A device to be used in teaching music, comprising a suitable staff, a series of interchangeable and removable characters adapted to be attached in position with relation to said staff, the characters being suitable to form the music it is desired to teach, each note provided with a tone-producing device adapted to be actuated when the note is struck.

4. A device to be used in teaching music, comprising a suitable staff, a series of interchangeable and removable notes adapted to be attached in position upon said staff in their proper relation to indicate the notes of the music, a tone-producing device associated with each note, the parts so related that the tone-producing device is actuated by the same movement that attracts attention to the note.

5. A device to be used in teaching music, comprising a suitable staff made up of a series of strips suitably supported in proper relation to each other, a series of interchangeable and removable notes, each provided with a holding piece or hook adapted to engage one of said strips so as to hold the note in position, and a tone-producing device associated with each note and representing the musical tone which said note stands for, said tone-producing device actuated by striking the note.

CYRUS KITCHING.

Witnesses:
DONALD M. CARTER,
HOMER L. KRAFT.